(12) United States Patent
Omura et al.

(10) Patent No.: US 6,565,692 B1
(45) Date of Patent: May 20, 2003

(54) RAW MATERIAL FOR GASKETS AND METHOD FOR FABRICATING SAME

(75) Inventors: Atsushi Omura, Nara (JP); Hiroshi Saito, Nara (JP)

(73) Assignee: Nichias Corporation, Tokyo (JP)

( * ) Notice: Subject to any disclaimer, the term of this patent is extended or adjusted under 35 U.S.C. 154(b) by 32 days.

(21) Appl. No.: 09/661,592

(22) Filed: Sep. 14, 2000

Related U.S. Application Data

(62) Division of application No. 09/212,543, filed on Dec. 16, 1998.

(30) Foreign Application Priority Data

Dec. 19, 1997 (JP) .............................. 9-364367

(51) Int. Cl.$^7$ .............................. B29C 41/00
(52) U.S. Cl. ................. 156/229; 156/242; 156/244.11; 264/134; 264/135
(58) Field of Search ................. 156/229, 344, 156/242, 244.11, 244.23, 244.24, 244.25; 264/135, 134; 428/323, 322.7, 304.4

(56) References Cited

U.S. PATENT DOCUMENTS 3,986,915 A * 10/1976 Farnam ...................... 156/256
4,719,065 A *  1/1988 Gibbon ........................ 156/245
4,759,962 A *  7/1988 Buecken et al. ......... 427/208.4
4,898,638 A *  2/1990 Lugez ........................ 156/242

* cited by examiner

Primary Examiner—Richard Crispino
Assistant Examiner—Sue A. Purvis
(74) Attorney, Agent, or Firm—Flynn, Thiel, Boutell & Tanis, P.C.

(57) ABSTRACT

In order to provide a raw material for foam rubber coated gaskets having a stable sealing property in a wide temperature range, a foam rubber layer or a liquid silicone foam rubber layer is formed on one surface of a metal plate, while a liquid silicone foam rubber layer is formed on the other surface thereof. The liquid silicone foam rubber layer is formed between the metal plate and a film. The film is later removed. Resilience after exposure to a high temperature atmosphere increases and a sealing property improves by forming the liquid silicone foam rubber layer in this way.

10 Claims, 1 Drawing Sheet

RAW MATERIAL FOR GASKETS AND METHOD FOR FABRICATING SAME

This is a division of Ser. No. 09/212,543, filed Dec. 16, 1998.

FIELD OF THE INVENTION

The present invention relates to a raw material for gaskets, in each of which foam rubber layers are formed on two surfaces of a metal plate, and a method for fabricating same, and in particular to an improvement of the raw material for gaskets having a good sealing property in a wide utilization temperature range.

DESCRIPTION OF THE PRIOR ART

As prior art foam rubber coat gaskets there were known gaskets, in each of which a solution, in which rubber compound obtained by blending arrangement agents usually used for rubber such as a reinforcing agent, a vulcanizing agent, etc. and a foaming agent with natural rubber or synthetic rubber such as NBR, etc. was dissolved in a solvent, or a latex solution was vulcanized and foamed after having been applied on two surfaces of a metal plate, and gaskets, in each of which foam rubber layers were formed by applying rubber latex on two surfaces of a metal plate by means of a knife coater, a shimmer coater, a roll coater, etc., drying and vulcanizing it after having foamed it mechanically.

Further liquid foam rubber bodies were used as sealing material for flanges. In this case sealing layers were formed by applying liquid silicone rubber material directly on the flanges and foaming it, using an FIPG (Formed-In-Place-Gasket) system in which an applying robot (a pump for conveying with pressure and dosing, a nozzle for mixing and extrusion, etc., and a system controlling them) is combined therewith.

Prior art foam rubber gaskets have drawbacks that the foam layers have a small amount of resilience after exposure to a low or high temperature atmosphere and that they cannot deal with displacement of flanges and an increased gap therebetween due to vibration and applied pressure, which causes leak of liquid from a sealed vessel, because foamed material made of natural rubber or synthetic rubber such as NBR, etc. is used, as described previously.

Further, since in a foam rubber body fabricated by means of a prior art system applying liquid foam rubber for gaskets gas produced by reactions in a raw material is easily evacuated through a surface of the raw material, it is difficult to obtain a foam rubber layer having a great foam rate. For this reason the foam rubber layers are necessarily hard and therefore for dealing with great vibration of flanges or an increased gap therebetween, it is necessary to form thick foam rubber layers and a large amount of raw material is required. In addition, it is not possible to obtain thin and soft foam rubber layers.

SUMMARY OF THE INVENTION

An object of the present invention is therefore to provide a raw material for foam rubber coat gaskets at a low price, which can solve the problems described above and has a stable sealing property in a wide utilization temperature range.

In order to achieve the above object, a raw material for gaskets according to a first invention is characterized in that a liquid silicone foam rubber layer is formed on at least one surface of a metal plate.

Liquid silicone rubber used for realizing the present invention is in a liquid state or grease-like before solidification and hardened and solidified at room temperature or by heating. There is known e.g. RTV (Room Temperature Vulcanization) silicone rubber.

A raw material for gaskets according to a second invention is characterized in that a liquid silicone foam rubber layer is formed on one surface of a metal plate, while a rubber or liquid silicone foam rubber layer is formed on the other surface thereof.

A method for fabricating a raw material for gaskets according to a third invention is characterized in that a film is stretched over at least one surface of a metal plate through a predetermined gap and a liquid silicone foam rubber layer is formed by extruding liquid silicone rubber into the gap on the surface of the metal plate under the film.

In this case, the liquid silicone foam rubber layer may be formed by extruding liquid silicone rubber after having blended a foaming agent, etc. therewith and then subjecting it to a heat treatment, if necessary.

A method for fabricating a raw material for gaskets according to a fourth invention is characterized in that a liquid silicone foam rubber layer is formed by stretching a film thereon after having formed a liquid silicone rubber layer by extruding liquid silicone rubber on at least one surface of a metal plate and before bridging and foaming reactions in the silicone rubber terminate.

The problems described above have been solved by the raw material according to the present invention owing to the fact that the liquid silicone foam rubber layer is formed on at least one surface of a metal plate so as to obtain a good sealing property in a wide utilization temperature range.

Further the problems described above have been solved by the methods for fabricating a raw material for gaskets, wherein foaming and formation are effected while preventing evacuation of gas by covering the surface of liquid raw material such as rubber by a film before start of the reactions at forming the liquid silicone foam rubber layer.

DESCRIPTION OF THE PREFERRED EMBODIMENTS

Hereinbelow several embodiments of the present invention will be explained.

Figure 1:
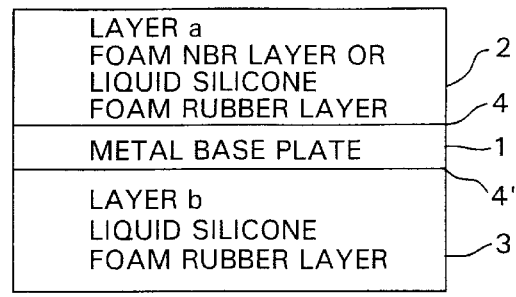
FIG. 1 is a schematical diagram showing an embodiment of a raw material for gaskets according to the present invention.

FIG. 1 shows a construction of a raw material for foam rubber coat gaskets as an embodiment of the raw material for gaskets according to the present invention, in which reference numeral 1 is a metal plate; 2 is a liquid silicone foam rubber layer (layer a) or a foam rubber layer; and 3 is a liquid silicone foam rubber layer (layer b). Further a primer layer 4 or 4' may be disposed in order to improve adhesivity of the liquid silicone foam rubber layer 2 or 3 to the metal plate 1.

Figure 2:
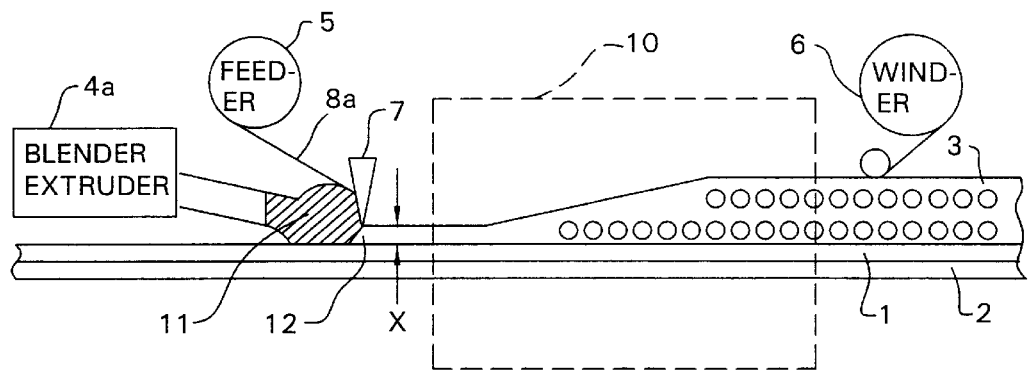
FIG. 2 is a diagram for explaining an embodiment of a method for fabricating a raw material for gaskets according to the present invention.
Figure 3:
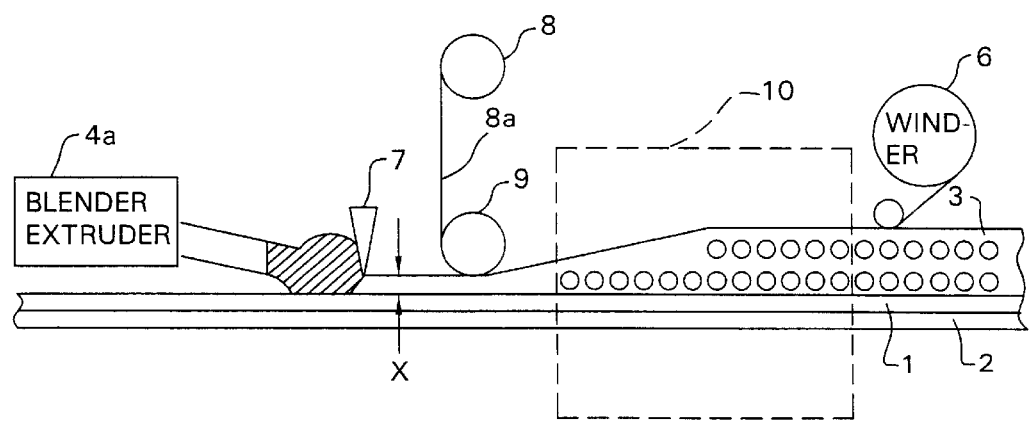
FIG. 3 is a diagram for explaining an example of modification of the embodiment indicated in FIG. 2.

FIG. 2 shows steps of forming a liquid silicone rubber/polyethylene film cover as an embodiment of the method for fabricating a raw material for gaskets for following embodiments 1 to 3, in which reference numeral 4a is a blender•extruder; 5 is a feeder; where a polyethylene film is wound; 6 is a winder therefor; 7 is a knife coater; 8a is the polyethylene film; and 10 is a heating oven. In this case, the method for feeding the coater with the film may be realized, as indicated in FIG. 3, in order to regulate the thickness of the liquid silicone foam rubber layer. In the figure, 8 is a feeder for the polyethylene film and 9 is a roll for sticking the film.

EMBODIMENT 1 (Refer to FIGS. 1 and 2)

At first, a surface of the metal plate 1 (e.g. a cold pressed steel plate, an aluminium plate, a stainless steel plate, etc. which are 0.15 to 0.8 mm thick) is degreased, roughened, and subjected to an anodizing (e.g. using one of phosphorates). Thereafter primer 4,4' (e.g. a coupling agent containing silanes, an adhesive agent containing phenol resins, etc.) is applied thereon and dried.

At first, a blended agent of a reinforcing agent, a vulcanizing agent, a thermal decomposition type foaming agent, etc. is kneaded with NBR and applied on one surface of the metal plate 1 and a rubber solution obtained by dissolving rubber in a solvent is applied thereon by means of the knife coater 7 and dried to form a foam rubber layer 2 100 μm thick.

Next, after having stretched the polyethylene film 8a so that it is fed by the feeder 5 and rewound by the winder 6 through the knife coater 7, as indicated in FIG. 2, liquid silicone rubber 11 is blended and extruded by means of the blender•extruder 4 into a gap 12 between the opposite surface of the metal plate 1 and the polyethylene film. The thickness x of the liquid silicone rubber 11 is regulated by means of the knife coater 7 (e.g. x=100 μm). Then the polyethylene film 8a is recovered by rewinding it by the winder 6 after having subjected it to a heat treatment at 50° C. (in a temperature range between 40 and 200° C.) in the heating oven 10 in 10 min (in a time range between 5 and 20 min) to form a liquid silicone foam rubber layer 3. The coat thickness x can be set above 50 μm. Further, adopting the method indicated in FIG. 3, covering by the film 8a is possible also after regulation of the thickness of the liquid silicone rubber 11 by means of the knife coater 7.

Thereafter a non-adhesive layer made of graphite, etc. is applied on the surface of the layer 3 and vulcanization is effected at 200° C. (in a temperature range between 160 and 240° C.) in 10 min (in a time range between 5 and 30 min) to obtain a raw material for gaskets 1.

EMBODIMENT 2 (Refer to FIGS. 1 and 2)

A raw material for gaskets is obtained according to a specification similar to EMBODIMENT 1 but different therefrom at the following points.

Liquid silicone rubber is used as a starting material for the layer a and the layers a and b are formed by a method indicated in FIG. 2 or 3 similar to that used for the layer b at the same time on both the surfaces of the metal plate 1 (steps after application of the non-adhesive layer are unnecessary).

EMBODIMENT 3 (Refer to FIGS. 1 and 2)

A raw material for gaskets is obtained according to a specification similar to EMBODIMENT 2 but different therefrom at the following points.

The thickness x is set at 300 μm at forming the layers a and b.

EXAMPLE FOR COMPARISON 1 (Refer to FIG. 2)

A raw material for gaskets is obtained according to a specification similar to EMBODIMENT 1 but different therefrom at the following points.

The foam rubber layers a and b are formed on the two surfaces of the metal plate by vulcanizing and foaming the layer b after application and drying by using rubber and a method similar to those used for the layer a. (Without film cover and no heat treatment at 50° C).

EXAMPLE FOR COMPARISON 2 (Refer to FIG. 2)

A raw material for gaskets is obtained according to a specification similar to EMBODIMENT 1 but different therefrom at a following point.

The layer b is formed by using no polyethylene film.

EXAMPLE FOR COMPARISON 3 (Refer to FIG. 2)

A raw material for gaskets is obtained according to a specification similar to EMBODIMENT 3 but different therefrom at a following point.

The layers a and b are formed by using no polyethylene film.

TABLE 1 indicates comparison of characteristics of EMBODIMENTS 1 to 3 and EXAMPLES FOR COMPARISON 1 to 3.

TABLE 1

| NUMBER | EMBODIMENT 1 | EMBODIMENT 2 | EMBODIMENT 3 | EXAMPLE FOR COMPARISON 1 | EXAMPLE FOR COMPARISON 2 | EXAMPLE FOR COMPARISON 3 |
|---|---|---|---|---|---|---|
| SEALING AMOUNT (μm) ** AFTER EXPOSURE TO HOT AIR * | 50 | 100 | 420 | 0 | 30 | 130 |
| SEALING AMOUNT (μm) AFTER EXPOSURE TO HOT OIL *** | 120 | 250 | 850 | 20 | 70 | 300 |

TABLE 1-continued

| NUMBER | EMBODIMENT 1 | EMBODIMENT 2 | EMBODIMENT 3 | EXAMPLE FOR COMPARISON 1 | EXAMPLE FOR COMPARISON 2 | EXAMPLE FOR COMPARISON 3 |
|---|---|---|---|---|---|---|
| THICKNESS OF LAYER a µm | 400 | 300 | 1200 | 400 | 400 | 750 |
| THICKNESS OF LAYER b µm | 300 | 300 | 1200 | 400 | 200 | 750 |
| FOAM MULTLPLI-CATION FACTOR IN RTV SILICONE RUBBER (TIMES) | 3 | 3 | 4 | — | 2 | 2.5 |
| SUPERFICIAL PROPERTY OF SILICONE FOAM RUBBER LAYER | SMOOTH, FORMATION OF SUPERFICIAL SKIN LAYER | SMOOTH, FORMATION OF SUPERFICIAL SKIN LAYER | SMOOTH, FORMATION OF SUPERFICIAL SKIN LAYER | — | SUPERFICIAL SLIGHT UNEVENNESS | SUPERFICIAL SLIGHT UNEVENNESS |

REMARKS)
* CONDITION OF EXPOSURE TO HOT AIR: 150° C. × 24 Hr
** SEALING AMOUNT: GAP BETWEEN FLANGES, AT WHICH NO LEAK IS PRODUCED AT PRESSURE OF LIQUID OF 1 kgf/cm² IN SEALED VESSEL
*** CONDITION OF EXPOSURE TD HOT OIL: 150° C. × 24 Hr (MOTOR OIL)

As explained above, according to the present invention, the amount of resilience after exposure to a high temperature atmosphere increases owing to the fact that a liquid silicone foam rubber layer is formed on at least one surface of a metal plate. Further it is possible to improve the sealing property owing to this increase in the amount of resilience.

Further evacuation of gas through the surface of the foam body decreases, foam magnification factor increases and superficial smoothness is improved by stretching a film over the surface at forming the liquid silicone foam rubber layer. In addition, the amount of resilience increases so that the sealing property can be improved, increase in the amount of foam at a low hardness improves the sealing property at a low superficial pressure, and it is possible to decrease a used amount of the raw material, owing to the fact that the foam magnification factor is increased. Moreover it is possible to reduce leak at a contact surface at a low superficial pressure.

What is claimed is:

1. A method for fabricating a raw material for gaskets comprising:
    a step of stretching a film over at least one surface of a metal plate through a gap;
    a step of extruding liquid silicone rubber on the surface of the metal plate under the film;
    a step of forming a liquid silicone foam rubber layer on the surface of the metal plate by heating the liquid silicone rubber; and
    a step of removing the film from the liquid silicone foam rubber layer.

2. The method for fabricating a raw material for gaskets of claim 1, including the step of applying a primer layer to the surface of the metal plate.

3. The method for fabricating a raw material for gaskets of claim 1, wherein the step of heating the liquid silicone rubber comprises heating the liquid silicone rubber at a temperature from 40 degrees C. to 200 degrees C. for a time from five minutes to twenty minutes to form the liquid silicone foam rubber layer.

4. The method for fabricating a raw material for gaskets of claim 1, including the step of applying a non-adhesive layer of graphite to the surface of the liquid silicone foam rubber layer.

5. The method for fabricating a raw material for gaskets of claim 1, including the step of forming a silicone foam rubber layer on an opposing surface of the metal plate.

6. A method for fabricating a raw material for gaskets comprising:
    a step of extruding liquid silicone rubber on at least one surface of a metal plate;
    a step of stretching a film on a liquid silicone rubber layer after forming the rubber layer from the liquid silicone rubber;
    a step of forming a liquid silicone foam rubber layer on the surface of said metal plate by heating the liquid silicone rubber layer below the film; and
    a step of removing the film from the liquid silicone foam rubber layer.

7. The method for fabricating a raw material for gaskets of claim 6, including the step of applying a primer layer to the surface of the metal plate.

8. The method for fabricating a raw material for gaskets of claim 6, wherein the step of heating the liquid silicone rubber comprises heating the liquid silicone rubber layer at a temperature from 40 degrees C. to 200 degrees C. for a time from five minutes to twenty minutes to form the liquid silicone foam rubber layer.

9. The method for fabricating a raw material for gaskets of claim 6, including the step of applying a non-adhesive layer of graphite to the surface of the liquid silicone foam rubber layer.

10. The method for fabricating a raw material for gaskets of claim 6, including the step of forming a silicone foam rubber layer on an opposing surface of the metal plate.

* * * * *